(12) United States Patent
Alberti et al.

(10) Patent No.: US 11,984,309 B1
(45) Date of Patent: May 14, 2024

(54) NON-RADIOACTIVE PLASMA ION SOURCE (71) Applicant: MICROPLASMA SYSTEMS, LLC, Odessa, FL (US)

(72) Inventors: James Joseph Alberti, Odessa, FL (US); Erkinjon G. Nazarov, Tampa, FL (US); Zev Litvak, Calabasas, CA (US)

(73) Assignee: MicroPlasma Systems, LLC, Odessa, FL (US)

( * ) Notice: Subject to any disclaimer, the term of this patent is extended or adjusted under 35 U.S.C. 154(b) by 208 days.

(21) Appl. No.: 17/334,458

(22) Filed: May 28, 2021

Related U.S. Application Data (60) Provisional application No. 63/032,136, filed on May 29, 2020.

(51) Int. Cl.
| | | |
|---|---|---|
| *H01J 49/10* | (2006.01) | |
| *G01N 27/624* | (2021.01) | |
| *H01J 49/02* | (2006.01) | |
| *H05H 1/24* | (2006.01) | |

(52) U.S. Cl.
CPC ............ *H01J 49/10* (2013.01); *G01N 27/624* (2013.01); *H01J 49/022* (2013.01); *H05H 1/2406* (2013.01)

(58) Field of Classification Search
CPC ...... H01J 49/10; H01J 49/022; G01N 27/624; H05H 1/2406
USPC ........................ 250/288, 423 R; 313/348–350
See application file for complete search history.

(56) References Cited

U.S. PATENT DOCUMENTS

| | | | |
|---|---|---|---|
| 7,091,481 B2 | 8/2006 | Miller et al. | |
| 7,274,015 B2 | 9/2007 | Miller et al. | |
| 7,279,680 B2 | 10/2007 | Miller et al. | |
| 9,111,738 B2 | 8/2015 | Tikhonski et al. | |
| 9,607,819 B1 | 3/2017 | Nazarov et al. | |
| 10,307,606 B2* | 6/2019 | Weltmann | A61L 2/0011 |
| 2012/0046597 A1* | 2/2012 | Morfill | A61L 2/14 |
| | | | 604/20 |
| 2012/0160997 A1* | 6/2012 | Fink | H01J 49/10 |
| | | | 250/288 |
| 2015/0088234 A1* | 3/2015 | Weltmann | A61B 18/042 |
| | | | 607/104 |

* cited by examiner

*Primary Examiner* — Michael Maskell
(74) *Attorney, Agent, or Firm* — John Rizvi; John Rizvi, P.A.—The Patent Professor ®

(57) ABSTRACT

A non-radioactive homogenous plasma ion source that is power efficient with greater electrode life longevity and performance (homogenous low temperature plasma for ion formation, stability, robustness) than alternative non-radioactive ion sources for generating analyte ions of either positive or negative charge. Its compact design minimizes the spacing between electrodes, reducing the power requirements needed to ignite and maintain plasma levels. The non-radioactive plasma ion source generally comprises a housing for retaining a uniquely designed ion source that generates a uniform distribution of plasma to maximize the generation of ions at a lower plasma temperature to minimize undesirable nitrogen oxide and ozone gasses, at least one planar electrode in one embodiment, a mounting head with a gas exhaust, and a chamber with a counterflow gas inlet, and an analyte gas inlet. The non-radioactive plasma source improves ion source reliability over existing non-radioactive sources that are less efficient with reduced electrode life longevity.

19 Claims, 7 Drawing Sheets

NON-RADIOACTIVE PLASMA ION SOURCE

CROSS-REFERENCE TO RELATED APPLICATIONS

This application claims the benefit of U.S. Provisional Patent Application Ser. No. 63/032,136, filed on May 29, 2020, which is incorporated herein in its entirety.

FIELD OF THE INVENTION

The present invention generally relates to ionic sources, more particularly, to a non-radioactive plasma ion source that has improved efficiency, performance, and longevity than alternative non-radioactive ion sources for generating analyte ions of either positive or negative charge polarity for operation at ambient pressure air.

BACKGROUND OF THE INVENTION

Ionized analyte molecules play a vital role in many applications, particularly applications that deal with chemical analysis. In many classical systems designed to perform chemical analysis, radioactive sources of alpha ($^{63}$Ni) or beta ($^{243}$Am) particles are typically used for the ionization process. The use of radioactive ion sources, however, is very expensive, includes regulatory limitations, and brings about potential health and safety hazards that limit, or otherwise impede, analysts from using said material as an ionizer for chemical analysis. As a result, many in the field have opted to create and use non-radioactive ion sources.

For instance, in one embodiment, those skilled in the art use a non-radioactive capacitive discharge ion source that includes crossed wire electrodes that, when subjected to high voltage, generate a plasma around the contact area of the crossed wires. The production of plasma at the singular point over the insulated crossed wires produces positive and/or negative ions used to electrically charge analyte molecules (ions). These analyte ions are then directed by an electric field and gas stream to an ion species analyser (e.g., ion mobility spectrometr (IMS), Differential mobility spectrometr (DMS), Mass spectrometer, etc.). In the insulated crossed wires design, the process of ionization produces a small volume of ionized molecules because only a small portion of the analyte molecules can contact the junction between the two crossed wires. To enhance ionization efficiency, it is desirable to increase the volume of generated plasma. Because of the heat generated by the plasma, over time, an oxide layer forms on the surface of the insulated crossed wires around the contact area, which leads to plasma contamination and non-stable operation. As the oxide layer forms and increases the dielectric barrier between the crossed wire electrodes, additional power is needed to ignite plasma until it can no longer be ignited due to power limitations. The single contact point of the insulated crossed wires design reduces electrode operational life time and increased replacement frequency.

Alternatively, others have tried to provide a sustainable non-radioactive ion source by employing the use of two electrodes, separated by two insulators with spacers, to form a gap between the two electrodes. This type of design, however, requires a higher voltage to ignite and sustain plasma generation due to the increased dielectric gap. Consequently, the need for higher voltage unnecessarily increases power consumption and the temperature of the generated plasma. Increased plasma temperature leads to greater generation of non-desirable gasses such as nitrogen oxide (NOx) and ozone ($O_3$) due to plasma chemistry in atmospheric air.

An ion source is an integral part of an analyzer and must operate reliably and efficiently in both positive and negative charge polarity with minimal cost to perform its intended function. Existing implementations of non-radioactive ion sources, however, have not yet met all of the required criteria as an acceptable solution in the marketplace as a viable replacement for traditional radioactive ion sources.

Accordingly, there is an established, but as of yet, unmet need for a non-radioactive ion source that is power efficient, provides homogenous plasma generation for uniform ion creation, has reliable electrode operational life, and can operate in both positive and negative charge polarity comparable to, and able to replace, traditional radioactive ion sources.

SUMMARY OF THE INVENTION

The present invention is directed to a non-radioactive plasma ion source that has improved power efficiency, increased volume of plasma cloud, improved laminar flow through the mesh member, and greater electrode life longevity than alternative non-radioactive ion sources for generating analyte ions of either positive or negative charge polarity. The improved design, in one exemplary embodiment, improves ion source reliability and provides means to reduce the required power to establish a functioning and reliable non-radioactive ion source.

Introducing a first embodiment of the invention, the present invention consists of a non-radioactive plasma ion source, comprising:
- an ion source housing for retaining an ion source;
- at least one chamber including a connection port connectable to a gas source;
- at least one planar electrode, the planar electrode mountable to a respective end of the ion source housing or the at least one chamber;
- a mounting head, mountable to the planar electrode or the ion source housing, the mounting head for mounting the non-radioactive plasma ion source to an external device;
- a passageway extending across a longitudinal axis of the non-radioactive plasma ion source for allowing gas to flow therethrough; and
- an ion source positioned along the passageway, comprising,
  - at least one meshed member, and
  - at least one insulated wire touching the at least one mesh member at multiple contact points.

In another aspect, the non-radioactive plasma ion source may include a pair of electrical terminals that is connectable to an external controller that otherwise controls and establishes the operating parameters of the non-radioactive plasma ion source.

In another aspect, the housing that retains the ion source, which in some exemplary embodiments may comprise an over-mold housing, may include a pair of electrical terminals for supplying voltage to the ion source.

In another aspect, the entire embodiment may be contained into a single over-mold housing, or multiple over-mold housings that are then assembled together.

In another aspect, a variable voltage is supplied to the ion source with an adjustable pulse frequency and adjustable duty cycle in a pulsating fashion. In one exemplary embodiment, the frequency may be adjustable equal to or greater than 400 Hz, and the pulse duty cycle may be adjustable at 0 percent to 100 percent, and the pulse rate may comprise a pulse width of less than about 20 $\mu$s. The application of a variable voltage in a pulsating fashion at a pulse width less than 20 us reduces the production of undesirable gasses: nitrogen oxide gas (NOx) and ozone ($O_3$), and provides high electron affinity. It is well known that the presence of these undesirable gasses in the chamber suppresses formation of negative ions from analyte molecules.

In another aspect, in some embodiments, the ion source may comprise at least one insulated wire interposed between on surfaces of at least two or more meshed members, wherein the at least one insulated wire touches at least two or more of the meshed members at multiple contact points. The at least one or more insulated wire touching the meshed members at several points produces a more homogenous formation of plasma, which in turn produces a more uniform production of ions (both positive and negative).

In another aspect, when performing positive ionization of analyte gas, at least one planar electrode is needed. The one planar electrode together with the ion source mesh member are used to create an electrical field to direct the movement of the positively charged analyte gas. Because in positive mode operation the presence of NOx or $O_3$, does not effect the formation efficiency of positive ions there is no need for additional gas chambers with gas conduits.

In another aspect, the non-radioactive ion source is connectable to an external device that may comprise a chemical analyzer.

In a second embodiment, a non-radioactive plasma ion source, comprising:
an ion source housing for retaining an ion source;
a first gas chamber having a first gas conduit;
a second gas chamber having a second gas conduit;
one or more planar electrodes for forming an electric field;
a first mounting head having a connection port connectable to an exhaust fitting;
a second mounting head for mounting the non-radioactive plasma ion source to an external device;
a passageway extending across a longitudinal axis of the non-radioactive plasma ion source for allowing gas to flow therethrough,
wherein the first gas conduit and the second gas conduit feed into the passageway, and
wherein a planar electrode is mountable inbetween the first mounting head and the ion source housing or inbetween the ion source housing and the second mounting head; and
an ion source positioned along the passageway, comprising,
at least one mesh member, and
at least one insulated wire touching the at least one mesh member at multiple contact points,
wherein the ion source member is capable of creating a homogeneous electric field by application of a direct current voltage to the one or more electrodes and the at least one mesh member of the ion source.

In another aspect, a varying degree of high voltage may be applied to each respective planar electrode to form an electric field to direct the desired movement of ions of a particular charge polarity, i.e., positive or negative, in a specific direction.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
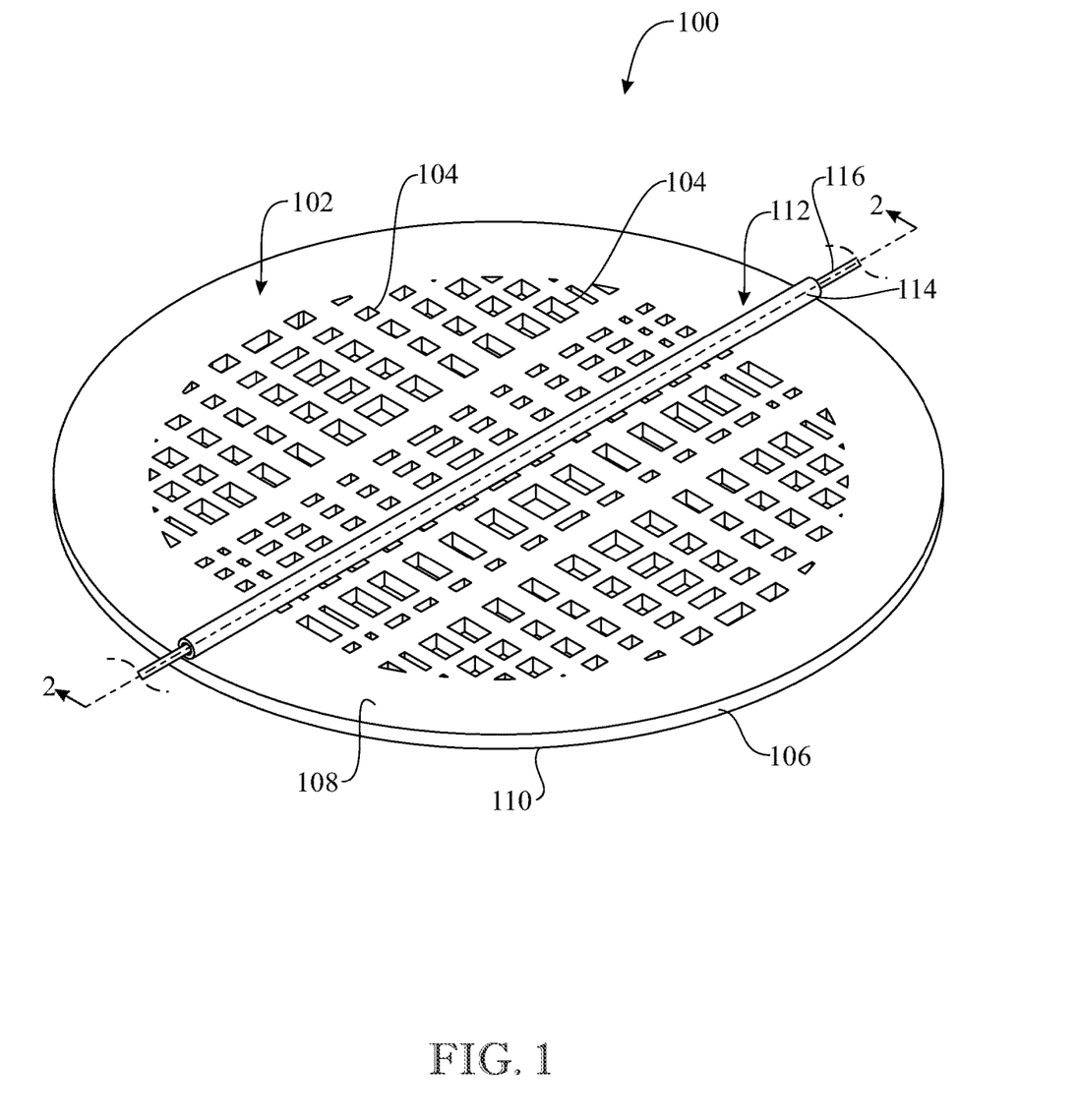
FIG. 1 presents an isometric view of the ion source of the non-radioactive plasma source of the present invention, namely the wire atop the meshed designed disk.
Figure 3:
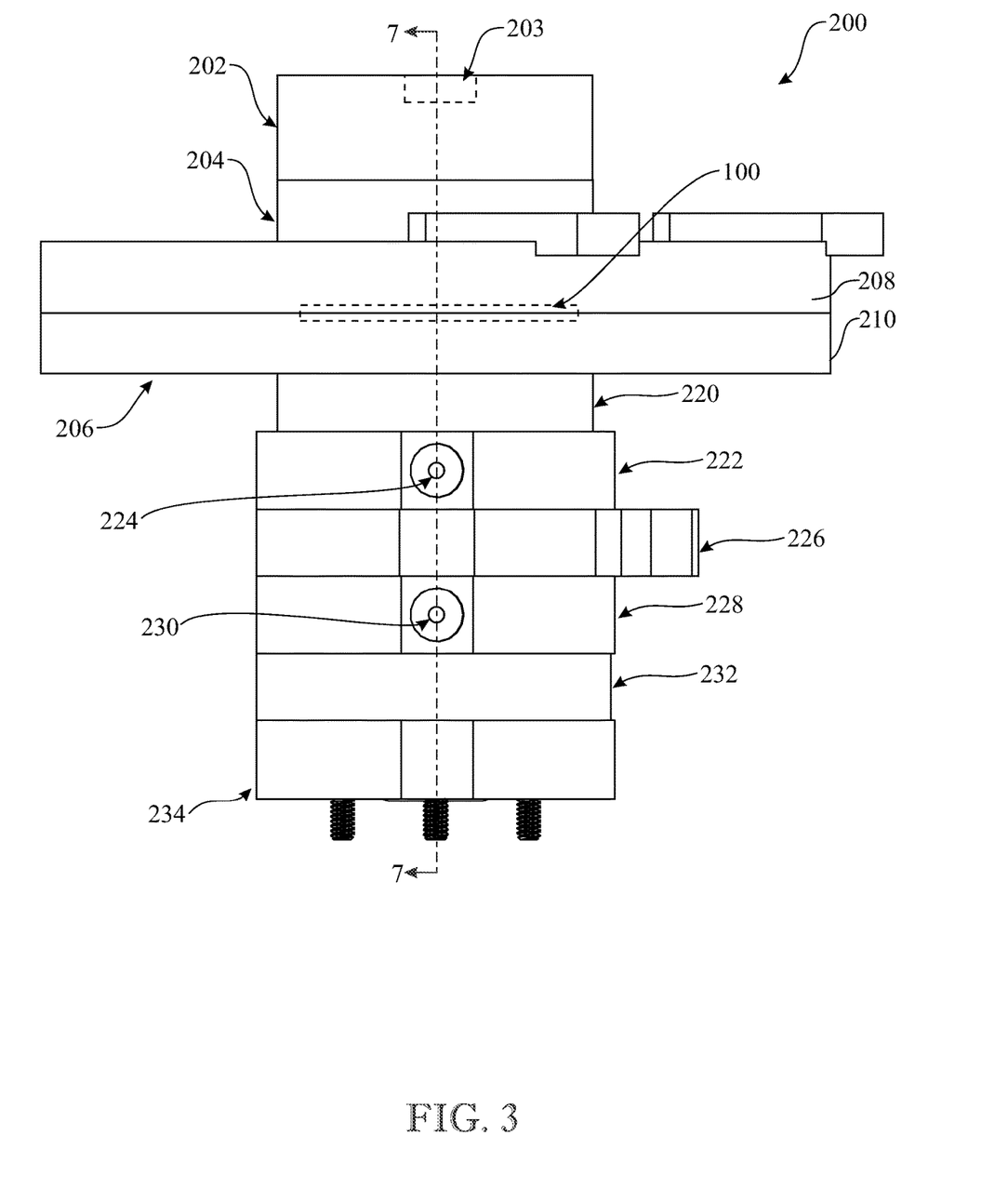
FIG. 3 presents a front elevation view of one exemplary embodiment of the non-radioactive plasma source of the present invention.
Figure 4:
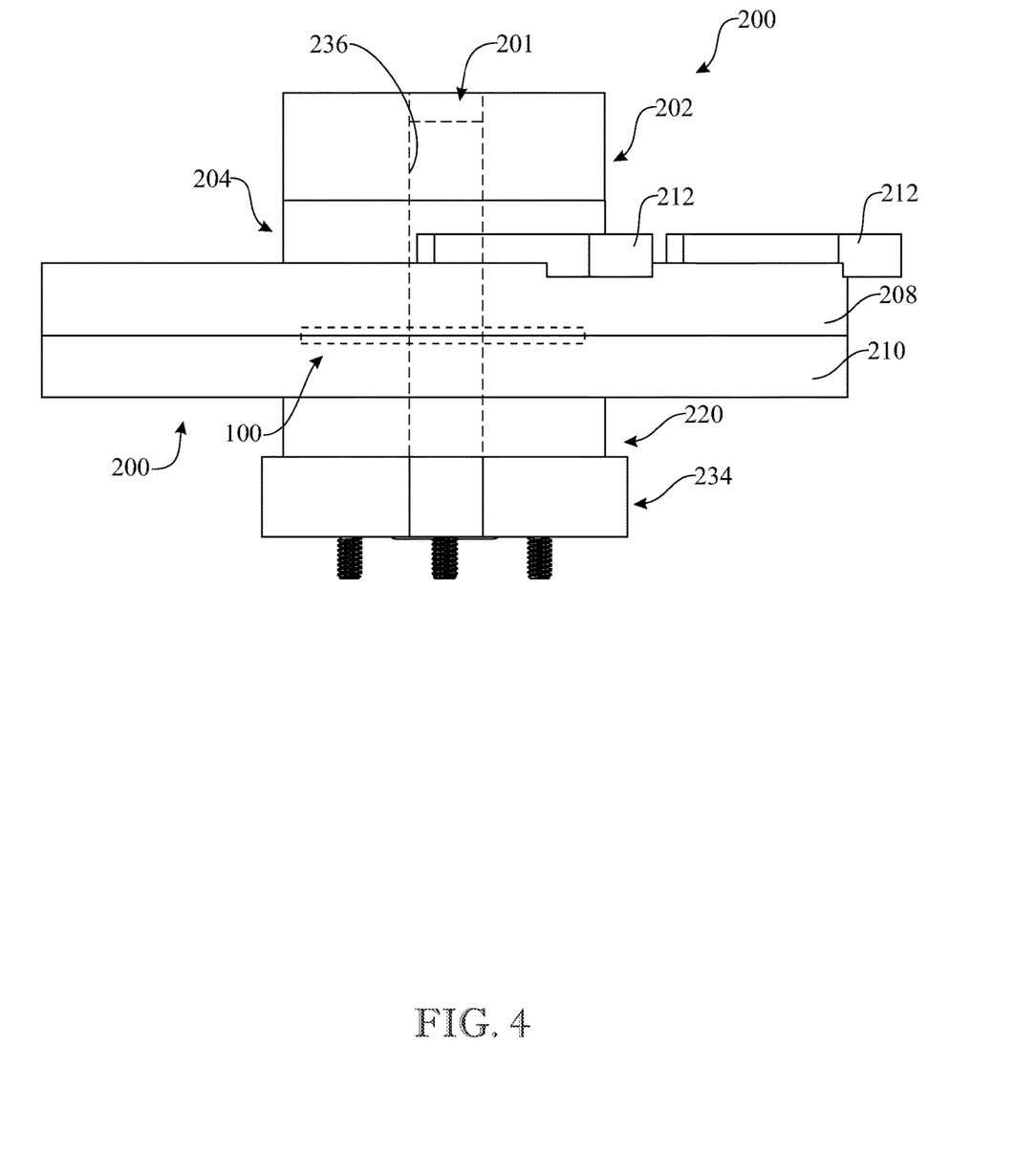
FIG. 4 presents a front elevation of few a secondary exemplary embodiment of the non-radioactive plasma source of the present invention.
Figure 5:
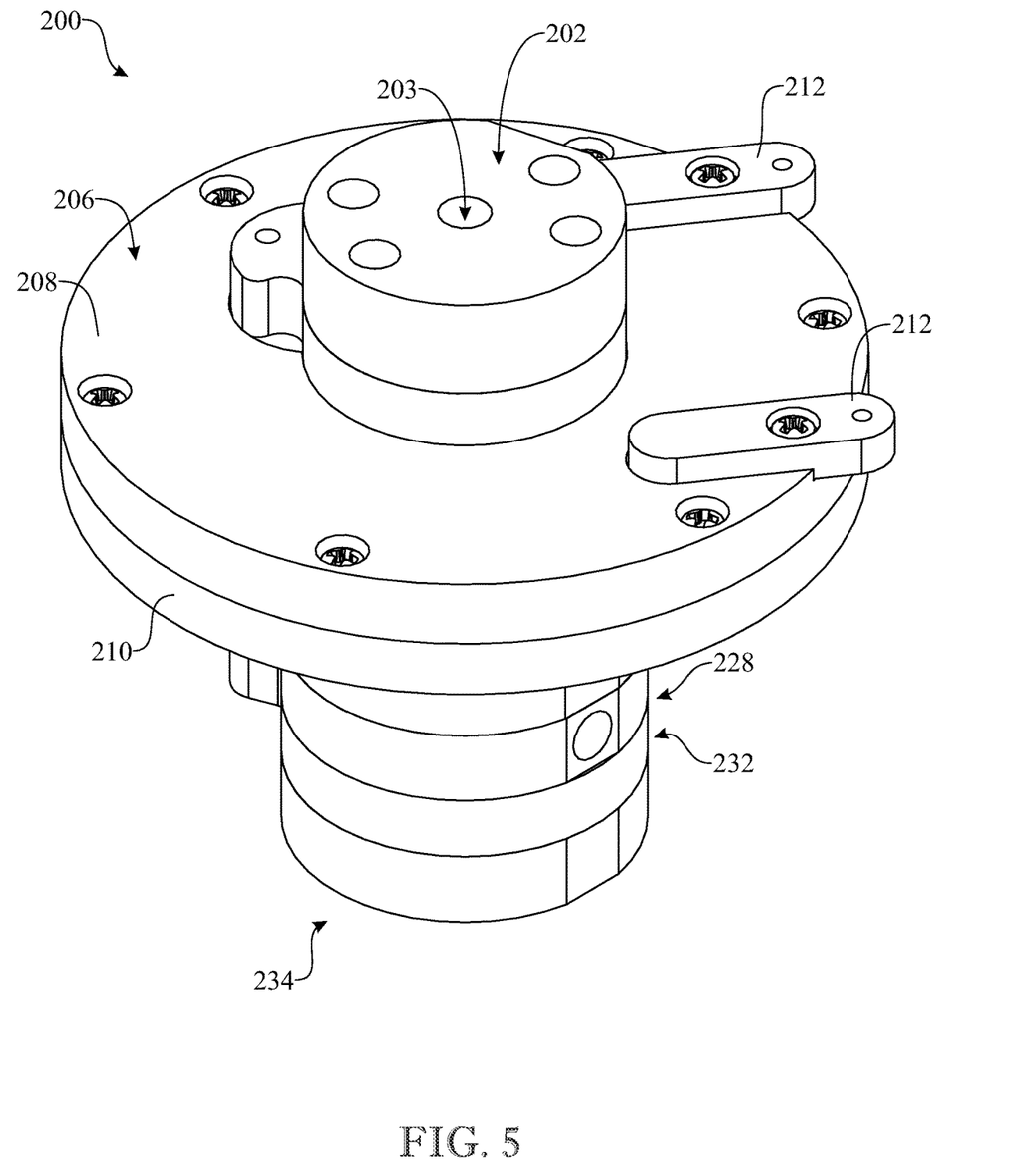
FIG. 5 presents a top perspective view of the non-radioactive plasma source embodiment shown in FIG. 3.
Figure 6:
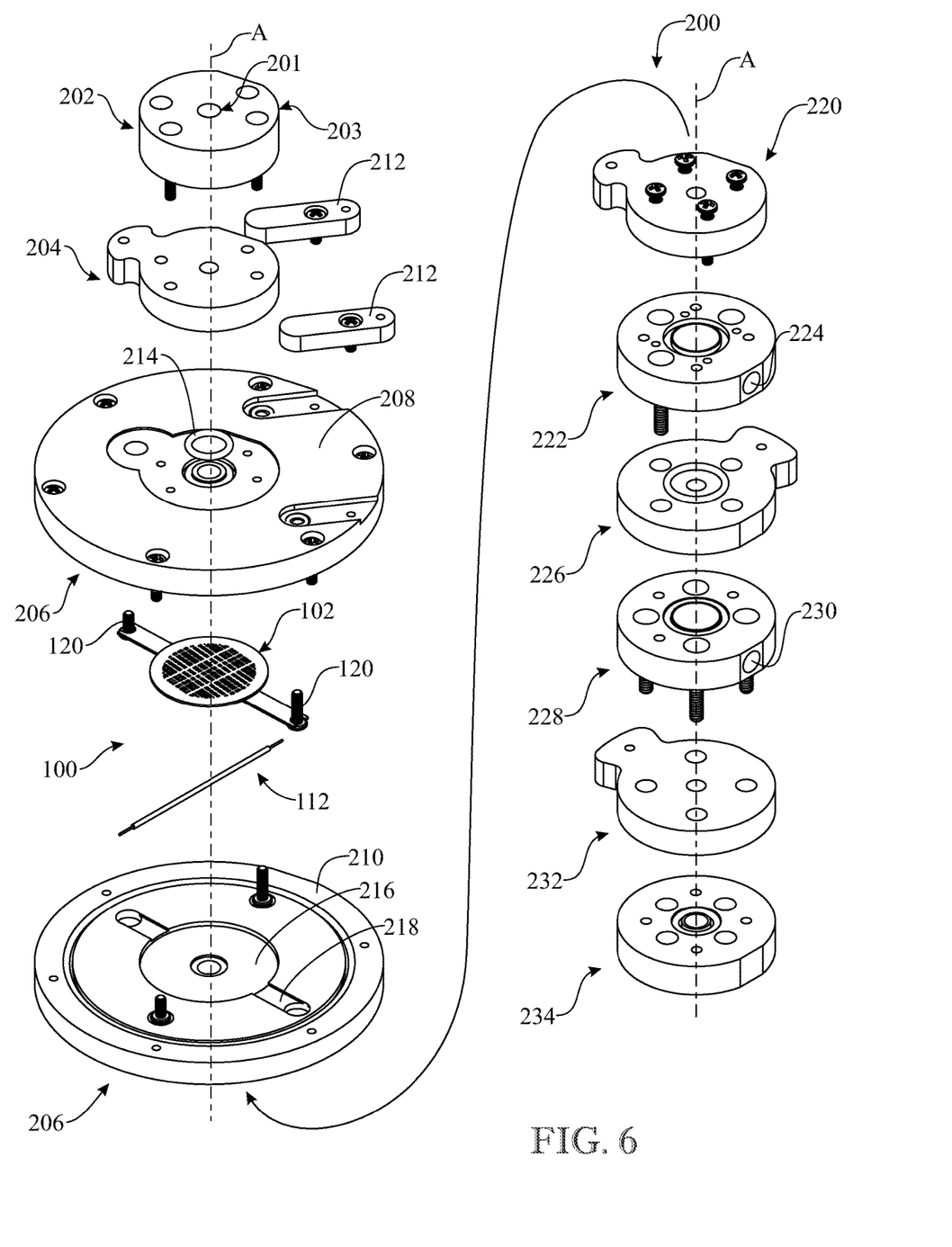
FIG. 6 presents an exploded view of the non-radioactive plasma source.

Referring initially to FIGS. 1 through 7, particularly FIGS. 1, 5, and 6, a non-radioactive ion plasma source 200 (hereinafter referred to as "non-radioactive ion source") in one exemplary embodiment is generally shown. The non-radioactive ion source 200 generally comprises an ion source 100, a housing 206 for retaining or otherwise encasing the ion source 100, a plurality of electrodes 204, 220, 226, 232, a plurality of gas chambers 222, 228, and a pair of mounting heads 202, 234 configured to mount the non-radioactive ion source 200 to an exhaust system, gas input system, or external device (not shown) as will be made clear further below. For purposes of the present invention, an external device herein is defined as any type of analyzer, chemical or otherwise, mass spectrometer, or any other device that is used to calculate the concentration of certain substances within a gas sample. An external device may also be defined as any computer system, external microcontroller, system or, device that includes a computer-readable storage medium that holds machine-readable instructions executable by logic machine, i.e., a processor or programmable control device, to provide implement, perform, and/or enact process and or tasks for analyzation of analyte gas. The controller or computing device (not shown) may include a display that includes a plurality of interactive controls that include, but not limited to, settings menu, configuration menu, pulse frequency menu, pulse Duty Cycle menu, charge polarity, voltage, system settings, recall system settings, or an On or Off control. Moreover, the term planar electrode used herein is given its ordinary and customary meaning in the art.

Figure 2:
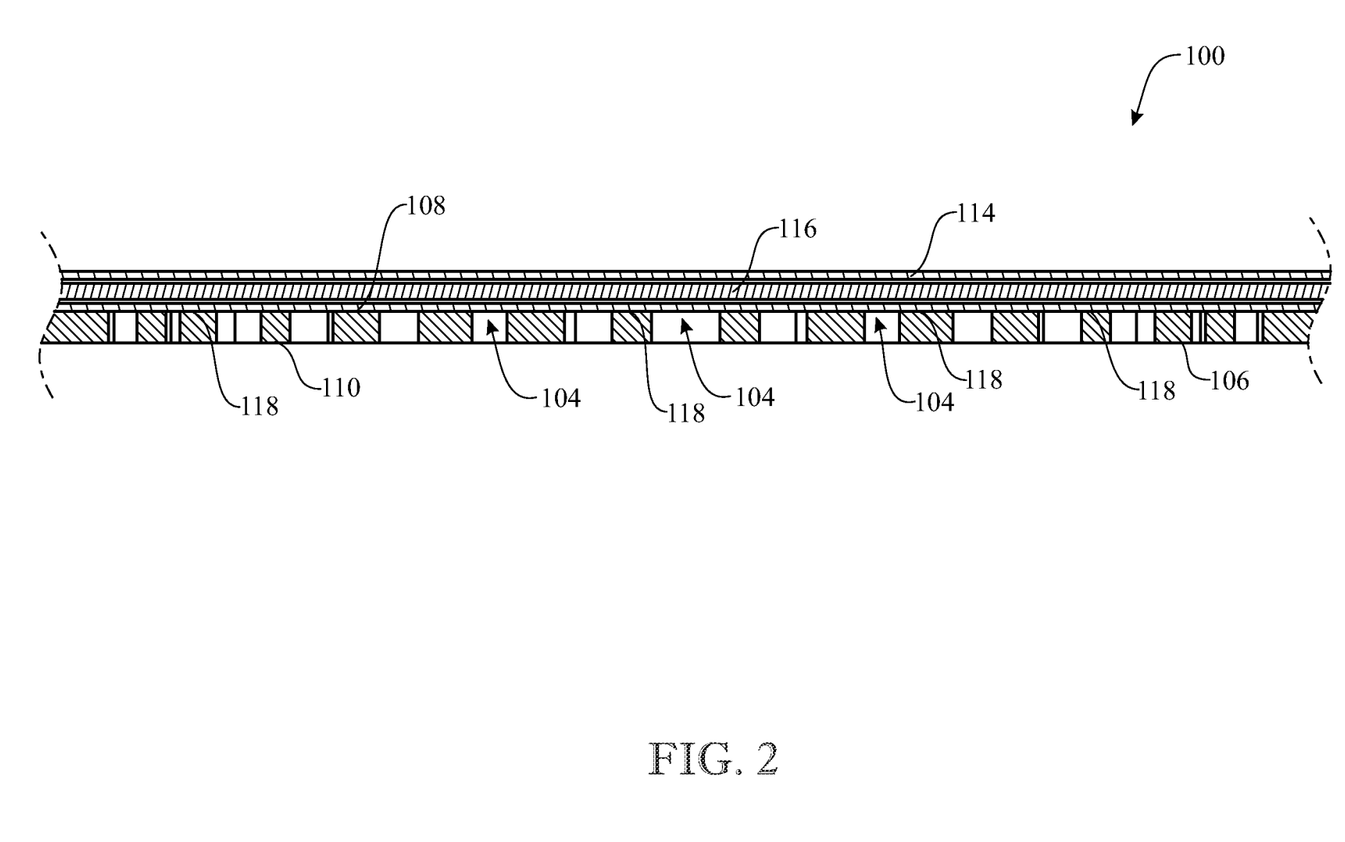
FIG. 2 presents a cross-sectional view taken across 2-2 as seen in FIG. 1, showing the insulated wire making contact with the meshed disk at various contact points.

With particular reference now to FIGS. 1 and 2, the non-radioactive ion source 200 includes an ion source 100. The ion source 100, in one exemplary embodiment, may comprise a member 102 having a first surface 108, a second surface 110, and a thickness 106 extending between the first surface 108 and the second surface 110. In some exemplary embodiments, member 102 may include at least one opening 104. Alternatively, as shown in FIG. 1, member 102 may comprise a plurality of openings 104 (or a mesh). As seen in the accompanying figures, the ion source 100 may be provided in the form of a grated disk or meshed disk with uniform openings 104. However, alternative embodiments include a rectangular meshed member (not shown), may be employed without departing from the scope of the invention. Accordingly, the shape illustrated in the drawings is to be considered exemplary and not limiting.

With continued reference to FIGS. 1 and 2, the ion source 100 may include an insulated wire 112 comprising a wire 116 encased with an insulator 114. The material used for the wire 112 and insulator 114 may be made out of any known material that is effective in the formation of plasma. For example, in some embodiments, insulator 114 may be made out of glass coating and, the wire may be made out of tungsten or stainless steel. The foregoing examples of material, however, are exemplary and are not to be considered limiting. As shown in FIG. 2, the insulated wire 112 rests on a surface 108 of member 102. More specifically, the insulator 114 insulating wire 116 is in direct contact with portions of member 102 at several contact junctions 118. In one exemplary embodiment, a voltage may be applied to the insulated wire 112 and member 102 via leads or terminals 212 (FIG. 5) in pulsating fashion from a voltage source (not shown) at an adjustable frequency to produce plasma. The formation of plasma in this manner results in the release of positive and negative ions in atmospheric conditions. The release of ions, however, includes the formation of undesirable gasses such as Nitrogen Oxides (NOx) and Ozone ($O_3$), which are toxic and harmful and suppresses the formation of negative ions from analyte molecules (reducing sensing capability). Accordingly, to maximize the production of ions while maintaining low levels of undesirable gasses, a specified pulse frequency that is adjustable and a specified pulse duty cycle that is adjustable needs to be applied to the ion source 100 to generate a variable voltage amplitude at a specified pulse width.

To define the appropriate pulse width ($\Delta t$), one first determines the time (T), which equals one cycle divided by the frequency (f) rate of the repetition of a signal per unit of time (measured hertz) or T=1/f. The duty cycle (D.C.) is the fraction of time ($\Delta t$), over one period T, that the signal is active. Duty Cycle is often described in percentage (%) and is defined as D.C.=($\Delta t$/T)*100%. Alternatively, the Duty Cycle can be described in terms of frequency as D.C.=($\Delta t$*f)*100%.

In this regard, the pulse width change in time (t) with a varying Duty Cycle at a specified frequency can be calculated as $\Delta t$=D.C.%/(f*100%). In one exemplary embodiment, when applying a voltage at a frequency of 600 Hz over a 1% Duty Cycle, $\Delta t$ equals the optimal $\Delta t$ for positive and negative ion release and minimal NOx and $O_3$ release. The optimal pulse width will equal about less than 20 µs. A pulse width greater than 20 µs at a frequency of 600 Hz at a 1% D.C. will result in the exponential increase of the undesired gases, i.e., NOx and $O_3$. In another exemplary embodiment, the optimal pulse width will equal about or be less than about 16.7 µs.

Unlike alternative non-radioactive ion sources, the instant ion source 100 establishes an increased number of contact points 118 between the insulated wire 112 and member 102 to produce or otherwise generate a uniform formation of plasma, thereby creating an even and improved distribution of ions (FIG. 2). The increased number of contact points 118 is an improvement over a single cross-over point design or similar designs that include single point contacts because the remaining contact points compensate degradation over a single cross-point. The novel ion source 100 design also includes a plurality of openings 104 to allow gas flow to pass therethrough as will be discussed in further detail below.

In an alternative exemplary embodiment, the ion source 100 may comprise a second meshed member, as described hereinabove, stacked or otherwise positioned atop the insulated wire 112, such that the insulated wire 112 interposes between the two meshed members 102. In this particular embodiment, the contact points 118, as seen on FIG. 2, between member 102 and the insulated wire 112 are about doubled, increasing uniformity and improving efficiency in positive and negative ion production. Whether using multiple members 102 or a singular member 102, the present design of the ion source 100 of the instant invention minimizes the air gap between electrodes by placing the insulated wire 112 on the surface 108 of the member 102. This type of arrangement or configuration lowers the required ignition voltage and reduces the power required for plasma ignition. The lower ignition voltage, along with an electronic driver (not shown), provides unmodulated narrow plasma ignition pulses to the insulated wire 112 and meshed member 102 to minimize plasma temperature, reducing the production of the undesirable gasses. Namely, the kinetic formation of desirable ions ($O_2$—) move faster than those of $NO_x$ and $O_3$, thus using pulsating voltage to generate the plasma minimizes the formation of undesirable gasses.

Figure 7:
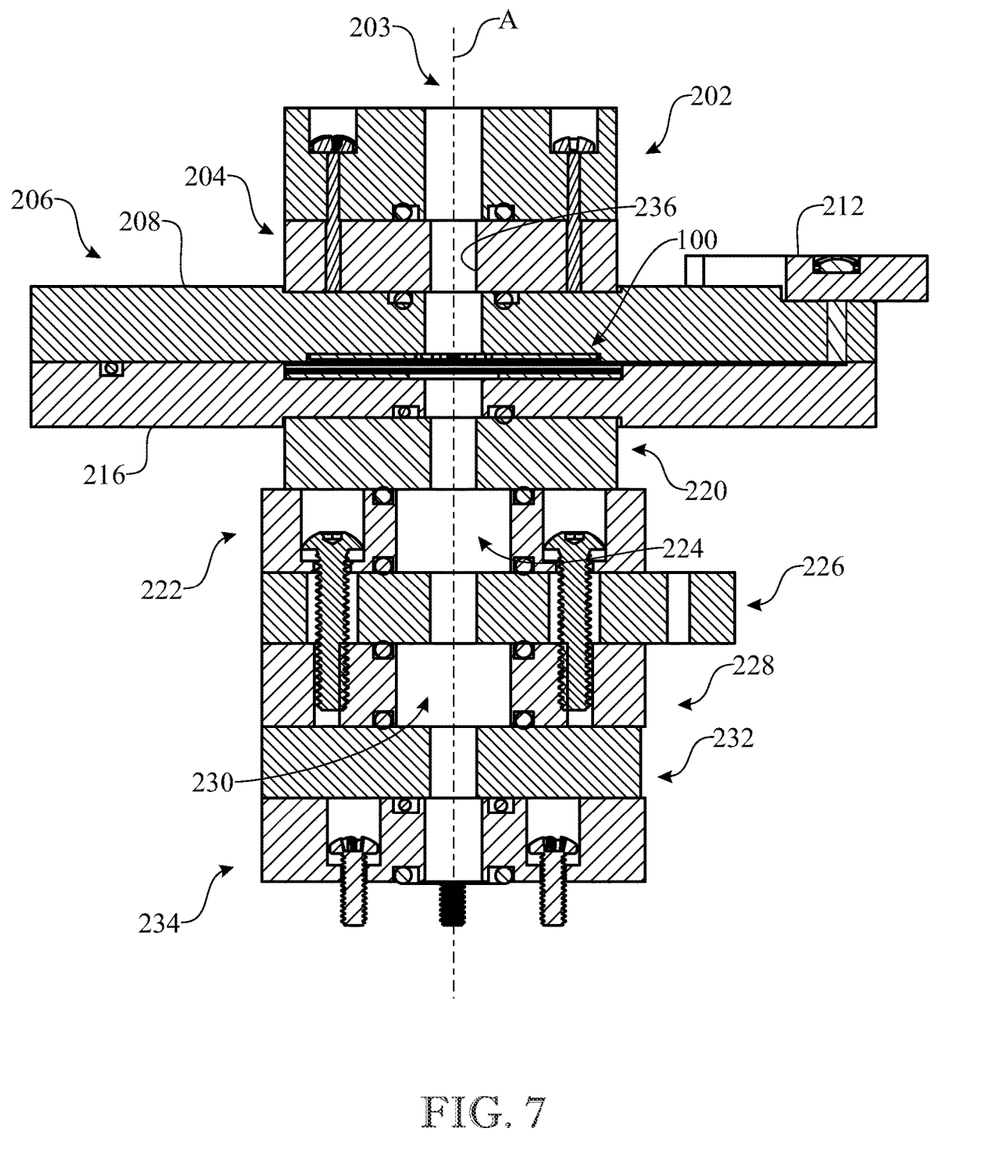
FIG. 7 presents a cross-sectional view taken across 7-7 as seen in FIG. 3, showing the components of the non-radioactive plasma source.

With reference now to FIGS. 1, 4, and 6, an exemplary embodiment of the non-radioactive ion source 200 for positive polarization, is generally shown. In this particular embodiment, the non-radioactive ion source 200 generally comprises a mounting head 202, at least one electrode 220, and a second mounting head 234 for mounting an external device. The mounting head 202 includes an inlet opening 201, in one exemplary embodiment, and mounting means 203 that allows the connection of an exhaust device or gas inlet device to the head 202. Mounted to the mounting head 202, opposite the inlet opening 201, is an optional planar electrode 204. Alternatively, mounting head 202 can be mounted directly to ion source housing 206. Mounted to the planar electrode 204 is an ion source housing 206 that retains or otherwise encases the ion source 100. In one exemplary embodiment, and as shown in FIGS. 4 and 6, the ion source housing 206 may comprise a first housing portion 208 that is selectively attachable via fasteners to a second housing portion 210. The first housing portion 208 may include at least two terminals 212 that make contact with leads 120 and insulated wire 112 that makes contact with the ion source 100 in order to apply pulsating voltage to the ion source 100, as described hereinabove, to ignite the plasma. The second housing portion 210, may include a recess and a pair of grooves or channels 218 for retaining therein the ion source 100. The ion source 100, comprising the insulated wire 112 atop the meshed member 102, is positioned in between the two housings 208, 210 within the recess 216 and channels 218 provided by the second housing portion 210 (FIG. 7). In this particular embodiment, to secure the first housing portion 208 and the second housing portion 210 are properly sealed, i.e., no gas can escape when the portions are fitted together, O-rings 214 are used between each component. Likewise, the use of O-rings can be used between the mounting of each mounting head, planar electrode, and chamber to ensure a proper seal.

With continued reference to FIG. 4, mounted to the ion source housing 206, is another planar electrode 220, and mounted to the planar electrode 220 is a mounting head 234 for mounting external devices (not shown). This particular configuration is useful for positive ionization of analyte gas, i.e., gas introduced into the non-radioactive ion source 200, for analysis. Accordingly, in one exemplary embodiment, a tube or the like configured to supply analyte gas and having a control valve is mounted to the mounting head 202 of the non-radioactive ion source 200 to feed analyte gas into the non-radioactive ion source 200. The analyte gas travels along a passageway 236 that extends through the entirety of the non-radioactive ion source 200 along its longitudinal axis A. Although not shown, an external controller is used to monitor the input of the analyte gas, monitor the polarization of the gas, and control the flow of analyte gas with positive ions in a particular direction by controlling the electric field formed by the planar electrodes. In one exemplary embodiment, high voltage DC (either positive or negative) is applied through a drive electronic to the planar electrodes 204, 220 (if a second planar electrode is used) and mesh member 102 to form an electric field that directs the desired ions of a particular charge polarity, or in this case positive ions, toward the mounting head that is mountable to an external device, such as an analyzer. The electronic drive controller (not shown) can control the electric field in a static position (i.e., neutral), or it can alternate the electric field such that positive or negative ions are alternatively directed toward a specified direction. For this exemplary embodiment, as seen in FIG. 4, the planar electrode and the ion source mesh member, each having a high voltage applied to it, function to provide an electric field to control the flow of the ionized gas. Put differently, the ion source is not only used to produce ions but also forms an electric field, reducing the number of planar electrodes needed to control the flow of ions in a specified direction. During positive ionization, the formation of undesirable gas, such as $NO_x$, has little to no adverse effect on detecting the analyte gas. As a result, there is no requirement for an exhaust chamber or a counter-gas inlet flow chamber.

Turning now to FIGS. 1, 3, 5 through 7, an exemplary embodiment of the non-radioactive ion source 200 for positive and negative polarization, is generally shown. The non-radioactive ion source 200 generally comprises a mounting head 202, one or more electrodes 204, 220, 226 232, a first and a second gas inlet chamber 222, 228, and a mounting head 234 for mounting an external device. The mounting head 202 of the non-radioactive ion source 200 generally includes an inlet opening 201, and mounting means 203 that allows the connection of a control valve connected to an exhaust device to the head 202. Mounted to the mounting head 202, opposite the inlet opening 201, is an optional planar electrode 204. Mounted to the optional planar electrode 204 is an ion source housing 206 that houses the ion source 100. As described hereinabove, the ion source housing 206 may comprise a first housing portion 208 that is selectively attachable via fasteners to a second housing portion 210, and includes at least two terminals 212 that make contact with leads 120 and insulated wire 112 that make contact with the ion source 100 to apply pulsating voltage to the ion source 100. The second housing portion 210, may include a recess and a pair of grooves or channels 218 for retaining the ion source 100 in between the two housings 208, 210 (FIG. 7). To secure the first housing portion 208 and the second housing portion 210 are properly sealed, o-rings 214 are used between each component. Likewise, the use of O-rings can be used between the mounting of each mounting head, planar electrode, and chamber to ensure a proper seal. In an alternative embodiment, the ion source housing 206 may comprise a unitary or multi-piece that envelopes the ion source 100, i.e., an over-mold. Accordingly, the construction and the description of the ion source housing as described herein should be considered exemplary and not limiting.

With continued reference to FIGS. 3 and 7, mounted to the ion source housing 206, is another optional planar electrode 220, and mounted to the optional planar electrode 220 is a first gas chamber 222 that includes a gas conduit 224 that connects with passageway 236 extending along the longitudinal axis A of the non-radioactive ion source 200. In one exemplary embodiment, a control valve (not shown) attached to a gas system is attached to the gas conduit 224 (otherwise known as a counter-flow gas inlet) of the first gas chamber 222 through known techniques in the art, e.g., threadedly attached. The valve allows a person to control the amount of desirable sample gas inadvertently exiting through the exhaust port 203 versus the undesirable gas being fed into the analyzer. The non-radioactive ion source 200 also includes a second gas chamber 228 that includes a gas conduit 230 (otherwise known as an analyte gas inlet). The gas conduit 230, like the gas conduit 224 of the first chamber 222, connects or intersects with the passageway 236 of the non-radioactive ion source 200. A control valve connected to an analyte gas device connects to the gas conduit 230 to feed analyte gas into the non-radioactive ion source. A planar electrode 226 may be mounted in between the two chambers 222, 228, as shown in FIG. 7. Alternatively, the planar electrode 226 may be mounted to an end side of the second gas chamber 228. In this particular embodiment, a mounting head 234 for mounting external devices (not shown) mounts to the planar electrode. Alternatively, as is shown in FIGS. 3 and 5, the planar electrode is mounted in between the two gas chambers 222, 228, and a fourth planar electrode 232 which is mounted to an end of the second gas chamber 228. The mounting head 234 and planar electrode 232 mount the non-radioactive ion source 200 to an external device.

During operational use, and with reference to FIGS. 1, 5 through 6, an external analyzer is mounted to the mounting head 234 of the non-radioactive ion source 200. Drive electronics are attached to terminals 212 of the ion source housing 206, and one or more planar electrodes 204, 220, 226, 232. An external controller is then connected to the electronic driver to set up the desired operating parameters of the system. A series of control valves are also connected to the non-radioactive ion source. For instance, a control valve connected to a counter-flow gas device is connected to the counter-flow gas inlet 224 of chamber 222. A second control valve connected to an analyte gas supply device is connected to the gas inlet 230 of chamber 228, and a control valve connected to an exhaust system is connected to the exhaust inlet 201 on the mounting head 202 of the non-radioactive ion source 200.

Once the non-radioactive ion source is connected to the above mentioned external devices, a high voltage electrical pulse and its reference ground are delivered by the drive electronics to the ion source 100. In particular, the high voltage driver delivers a voltage at a pulse width of sufficient magnitude to member 102 and the insulated wire 112 of the ion source 100 to ignite plasma at the contact points 118 (FIG. 2). As described hereinabove with greater detail, the frequency of the voltage should be equal to or greater than about 400 Hz, with the pulse width being less than 20 μs. As explained above, plasma is sustained by the repetitive pulses of sufficient magnitude applied to the ion source to prevent the plasma from extinguishing and maintaining the plasma at minimal power. The magnitude of the high voltage pulse, pulse frequency and pulse duty cycle are adjustable through the drive electronics and controller.

External gas, such as but not limited to air or helium, is introduced through the counter-flow gas inlet 224 on gas chamber 222 into the passageway 236 of the non-radioactive ion source to direct any residual non-desirable gases, such as NOx and $O_3$, formed by the plasma out of the exhaust port located at the end of the mounting head 202. A control valve is threadedly attached to the exhaust port to control or otherwise balance the amount of gas escaping the non-radioactive ion source. Sample gas, i.e., analyte gas, is introduced into passageway 236 through the analyte gas inlet 230 on gas chamber 228. High voltage DC (either positive or negative) is applied to each respective optional planar electrode 204, 220, 226, 232, and to ion source member 102 to form an electric field to direct the desired ions of a particular charge polarity, i.e., negative or positive, toward the second chamber 228, combining the specific ions with the analyte gas, and directing the ionized gas into the external analyzer mounted to mounting head 234 of the non-radioactive ion source 200. The magnitude of each voltage applied to each planar electrode is adjustable to ensure a uniform electric field is achieved throughout the non-radioactive ion source.

Accordingly, when the plasma generated ions, directed by the electric field, collide with the sample gas (i.e., analyte gas) introduced into the non-radioactive ion source via the gas inlet 230 on the gas chamber 228, the analyte gas becomes ionized, subjecting the gas to the influence of the electric field. The electric field directs the ionized sample gas into the analyzer that mounts to the non-radioactive ion source 200 and connects with its internal passageway 236. Because different gasses have an affinity for either positive or negative ions, the electronic controllers can be used to either positively ionize the analyte gas or negatively ionize the analyte gas and direct it toward the analyzer for analysis.

In summary, the present invention comprises a non-radioactive plasma ion source that is efficient and provides longevity as a non-radioactive ion source for generating analyte ions of either positive or negative charge. Its compact design minimizes the spacing between electrodes, reducing the power requirements needed to ignite and maintain plasma levels. The non-radioactive plasma ion source utilizes a uniquely designed ion source that generates a uniform distribution of plasma to maximize the generation of ions, one or more planar electrodes in one exemplary embodiment, a chamber with a gas exhaust, a chamber with a counter-flow gas inlet, and a chamber with an analyte gas inlet. The non-radioactive plasma source improves ion source reliability over existing non-radioactive sources that are inefficient and are not durable.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A non-radioactive plasma ion source, comprising:
    an ion source housing for retaining an ion source;
    at least one chamber including a connection port connectable to a gas source;
    at least one planar electrode for forming an electric field, the planar electrode mountable to a respective end of the ion source housing or the at least one chamber;
    a mounting head, mountable to the planar electrode or the ion source housing, the mounting head for mounting the non-radioactive plasma ion source to an external device;
    a passageway extending across a longitudinal axis of the non-radioactive plasma ion source for allowing gas to flow therethrough; and
    the ion source positioned along the passageway, the ion source comprising:
        at least one mesh member; and
        at least one insulated wire touching the at least one mesh member at multiple contact points, wherein the ion source is positionable a distance from the at least one planar electrode, and wherein the ion source together with the at least one planar electrode are capable of changing a direction of the electric field by application of a voltage of opposite polarity to the at least one planar electrode and the at least one mesh member of the ion source.

2. The non-radioactive plasma ion source of claim 1, wherein the ion source housing includes a pair of electrical terminals for supplying a variable voltage amplitude to the ion source.

3. The non-radioactive plasma ion source of claim 1, wherein an external controller is used to connect to a pair of electrical terminals on the ion source housing to provide an adjustable pulse frequency with an adjustable duty cycle to generate a variable voltage amplitude that is applied to the at least one mesh member and the at least one insulated wire in a pulsating rate to produce plasma that releases positive and negative ions.

4. The non-radioactive plasma ion source of claim 3, wherein the pulse rate includes a pulse width of less than about 20 μs duration.

5. The non-radioactive plasma ion source of claim 3, wherein the adjustable pulse frequency is equal to or greater than about 400 Hz.

6. The non-radioactive plasma ion source of claim 3, wherein the adjustable duty cycle is adjustable from 0 percent to 100 percent.

7. The non-radioactive plasma ion source of claim 1, wherein the at least one planar electrode together with the ion source are capable of creating a homogeneous electric field by application of a voltage to the at least one planar electrode and the at least one mesh member.

8. The non-radioactive plasma ion source of claim 1, wherein the at least one mesh member comprises at least two mesh members with the at least one insulated wire interposing the mesh members and touching each mesh member at multiple contact points.

9. The non-radioactive plasma ion source of claim 1, wherein the at least one mesh member comprises a plurality of openings to allow bi-directional gas flow through the passageway throughout the non-radioactive plasma ion source.

10. The non-radioactive plasma ion source of claim 1, wherein the external device is a chemical analyzer.

11. A non-radioactive plasma ion source, comprising:
an ion source housing for retaining an ion source;
a first gas chamber having a first gas conduit;
a second gas chamber having a second gas conduit;
one or more planar electrodes for forming an electric field;
a first mounting head having a connection port connectable to an exhaust fitting;
a second mounting head for mounting the non-radioactive plasma ion source to an external device;
a passageway extending across a longitudinal axis of the non-radioactive plasma ion source for allowing gas to flow therethrough,
wherein the first gas conduit and the second gas conduit feed into the passageway, and
wherein a planar electrode is mountable inbetween the first mounting head and the ion source housing or inbetween the ion source housing and the second mounting head; and
the ion source positioned along the passageway, the ion source comprising:
at least one mesh member;
at least one insulated wire touching the at least one mesh member at multiple contact points,
wherein the ion source and the one or more planar electrodes are capable of creating a homogeneous electric field by application of a voltage to the one or more planar electrodes and the at least one mesh member of the ion source, and wherein the ion source is positionable a distance from at least one planar electrode, and wherein the ion source together with the one or more planar electrodes are capable of changing a direction of the electric field by application of a voltage of opposite polarity to the one or more planar electrodes and the at least one mesh member of the ion source.

12. The non-radioactive plasma ion source of claim 11, wherein the ion source housing for retaining the ion source includes a pair of electrical terminals for supplying a voltage to the ion source.

13. The non-radioactive plasma ion source of claim 11, wherein an external controller is used to connect to a pair of electrical terminals on the ion source housing to provide an adjustable pulse frequency with an adjustable duty cycle to generate a variable voltage amplitude that is applied to the at least one mesh member and the at least one insulated wire in a pulsating rate to produce plasma that releases positive and negative ions.

14. The non-radioactive plasma ion source of claim 13, wherein the pulse rate includes a pulse width of about 20 μs duration.

15. The non-radioactive plasma ion source of claim 13, wherein the adjustable pulse frequency is adjustable at about equal to or greater than about 400 Hz.

16. The non-radioactive plasma ion source of claim 13, wherein the duty cycle is adjustable from 0 percent to 100 percent.

17. The non-radioactive plasma ion source of claim 11, wherein an adjustable pulse frequency and an adjustable duty cycle are applied to the ion source in a pulsating rate to reduce production of nitrogen oxide gas and ozone.

18. The non-radioactive plasma ion source of claim 11, wherein the at least one mesh member comprises a plurality of openings to allow bi-directional gas flow through the passageway throughout the non-radioactive plasma ion source.

19. A non-radioactive plasma ion source, comprising:
an ion source housing for retaining an ion source;
a first gas chamber having a first gas conduit;
a second gas chamber having a second gas conduit;
one or more planar electrodes for forming an electric field;
a first mounting head having a connection port connectable to an exhaust fitting;
a second mounting head for mounting the non-radioactive plasma ion source to an external device, wherein the external device is a chemical analyzer;
a passageway extending across a longitudinal axis of the non-radioactive plasma ion source for allowing gas to flow therethrough,
wherein the first gas conduit and the second gas conduit feed into the passageway, and
wherein a planar electrode is mountable inbetween the first mounting head and the ion source housing or inbetween the ion source housing and the second mounting head;
the ion source positioned along the passageway, comprising,
at least one mesh member; and
at least one insulated wire touching the at least one mesh member at multiple contact points; and
an external controller is used to connect to a pair of electrical terminals on the ion source housing to provide an adjustable pulse frequency with an adjustable duty cycle to generate a variable voltage amplitude that is applied to the at least one mesh member and the at least one insulated wire in a pulsating rate to produce plasma that releases positive and negative ions,
wherein the pulse rate includes a pulse width of less than about 20 μs duration, and the adjustable pulse frequency is adjustable at about equal to or greater than about 400 Hz, and the duty cycle is adjustable from 0 percent to 100 percent, and
wherein the ion source and the one or more planar electrodes are capable of creating a homogeneous electric field from application of the variable voltage to the one or more planar electrodes and the at least one mesh member of the ion source.

* * * * *